INVENTORS
REGINALD O. MEDLIN JR.
LAWRENCE E. TROWBRIDGE

INVENTORS
REGINALD O. MEDLIN JR.
LAWRENCE E. TROWBRIDGE
BY
*E. F. Bard*
ATTORNEY

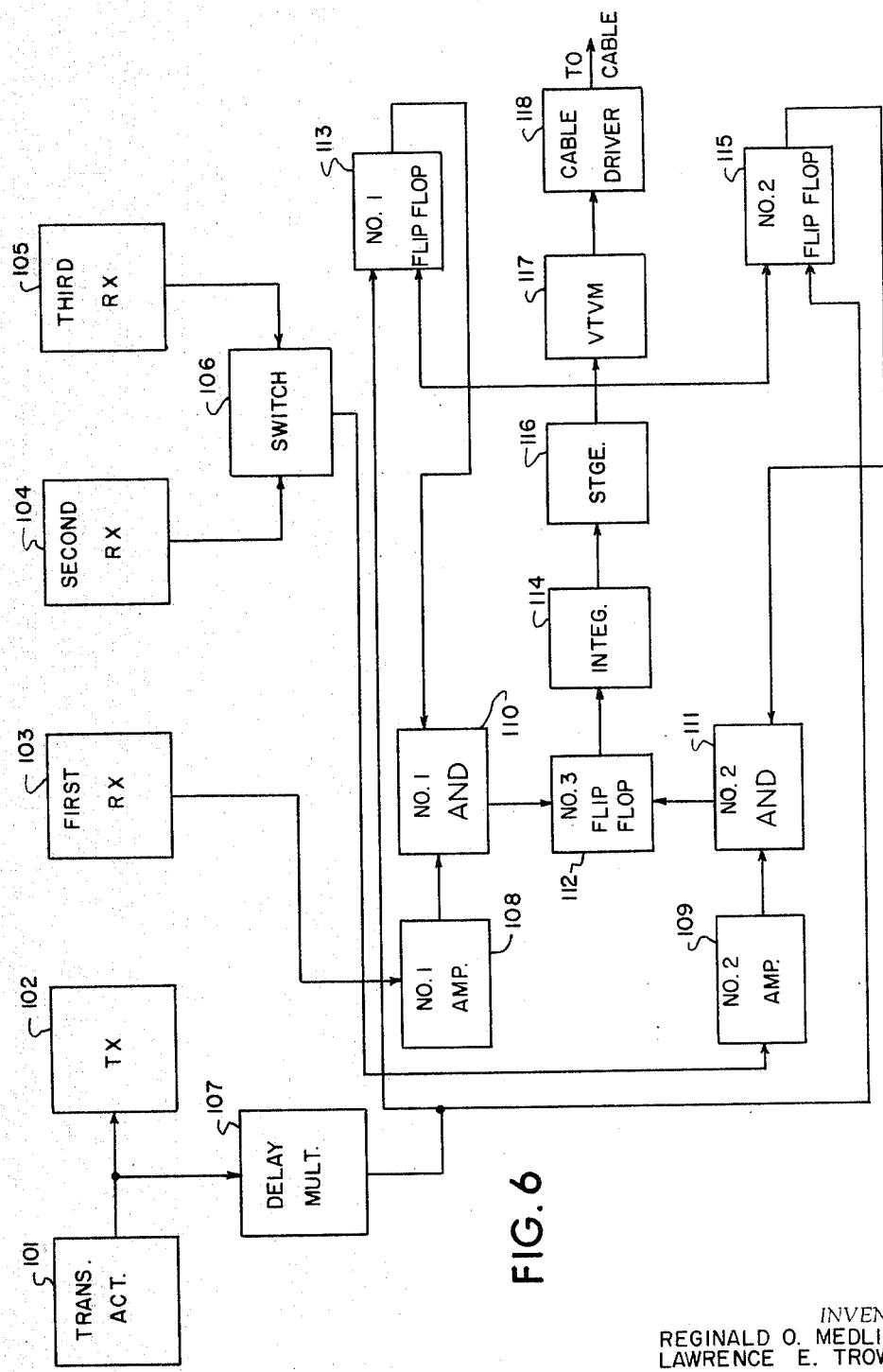

United States Patent Office 3,299,400
Patented Jan. 17, 1967

3,299,400
DUAL-SPACED ACOUSTICAL WELL
LOGGING SYSTEM
Lawrence E. Trowbridge and Reginald O. Medlin, Jr.,
Houston, Tex., assignors to Dresser Industries, Inc.,
Dallas, Tex., a corporation of Delaware
Filed Feb. 14, 1964, Ser. No. 344,911
6 Claims. (Cl. 340—18)

This invention relates to methods and apparatus for investigating the characteristics of subsurface earth formations traversed by a borehole, and more particularly relates to methods and apparatus for measuring the velocity with which an acoustic pulse traverses such formations.

Acoustic well logging systems employing an acoustic energy transmitter and one or more acoustic energy receivers are now widely employed, in the oil and gas industry, for the purpose of measuring earth characteristics such as the porosity of subsurface earth formations. Although there are several well established acoustic logging techniques, the most widely known technique involves the measurement of the velocity at which a formation will conduct acoustic energy. Accordingly, most systems now in commercial use employ a spaced-apart array of acoustic energy transducers arranged to be longitudinally passed through the borehole, wherein one of the transducers is adapted to periodically generate a sharp pulse of acoustic energy, and wherein the other transducers are adapted to sense the pulse as it progresses past them through adjacent earth formations. Acoustic energy is known to pass more slowly through fluid than through earth or rock, and therefore the first acoustic energy detected by each receiving transducer is assumed to have traveled from the acoustic pulse generator, to each receiver, by way of the adjacent earth formations rather than through the borehole.

Although the velocity at which an acoustic impulse travels through a medium furnishes a direct indication of the porosity of the medium, the accuracy of such a measurement presupposes a medium of homogeneous composition. However, the various earth formations encountered along the borehole differ not only in composition, but also in thickness. When the logging instrument is passed through the borehole, and when two spaced-apart transducers are located adjacent different formations, the resulting velocity measurement will suffer as a result of the acoustic pulse having traveled across two different formations of different porosity. In order to overcome this difficulty, many of the present acoustic logging systems include two receiving transducers spaced only one foot apart, so that this pair of receivers will pass relatively quickly past formation interfaces, as the logging instrument is passed through the borehole, and so that the majority of the measurements thus obtained will relate to earth material of the same character.

So-called "short-spaced" logging measurements have not been entirely satisfactory, however, since they are particularly subject to error due to changes in borehole diameter. Although the acoustic impulse generally travels much faster through the earth than through the fluids in the borehole, the impulse must pass out of the earth and through the fluid in order to reach the receivers. If the gap between the logging instrument and borehole wall is relatively small, and if this gap is generally of the same size, then each of a sequence of velocity measurements will vary substantially only as a result of changes in the character of the formations. However, many earth boreholes tend to vary substantially in shape and size throughout their length. Thus, short-spaced logging measurements are often erratic and unreliable, since variations in measured velocity may be due as much to changes in borehole diameter as to changes in formation character.

In order to overcome this problem, many acoustic logging instruments are now equipped with caliper arms which measure the borehole diameter as the tool is passed through the borehole, and the caliper measurement is then used to correct the velocity measurement. Furthermore, many logging tools now have their receiving transducers spaced three times as far apart as they are in "short-spaced" logging apparatus. Velocity measurements taken across a three-foot receiver spacing, although not as individually accurate as valid one-foot measurements, tend to minimize errors due to variations in borehole diameter.

Accordingly, it has been the practice to first attempt to log a borehole with a logging tool employing two short-spaced receivers. If an erratic measurement is obtained which shows an irregular borehole, then the well is re-logged with a tool having two long-spaced receivers. Since a great deal of time may be consumed in making the first unsatisfactory measurement, a way has long been sought to make either both measurements simultaneously (and thus correlatively) during a single trip through the borehole, or to change from one measurement to the other without the necessity of first removing the short-spaced tool from the borehole.

An improved acoustic velocity logging system, which employs both a short and a long spaced measurement, is disclosed in the co-pending patent application filed June 14, 1960, by Adrian P. Brokaw, and having Serial Number 35,969. This system employs a logging tool having an acoustic generator or transmitter, and three spaced-apart receivers. The first receiver is spaced at least three feet from the transmitter, the second receiver is spaced one foot from the first receiver, and the third receiver is spaced three feet from the second receiver and a total of seven feet from the transmitter. Each acoustic impulse thus travels from the transmitter successively past the first, second, and third receivers, and therefore provides correlative one foot and three foot measurements for interpreting the character of the formations sought to be investigated. Although this improved system provides acoustic logging measurements which are superior to those hitherto obtained, and although the system performs quite satisfactorily in so-called "hard rock" country, it has not always performed adequately in areas where the formations are composed of unconsolidated (soft and crumbly) materials. Such formations tend to have the greatest damping effect on the amplitude of the acoustic impulse, and since the impulse weakens rapidly as it travels away from the transmitter, the third receiver—which is seven feet from the transmitter—often cannot detect the impulse when it arrives.

These disadvantages of the prior art are overcome with the present invention, and novel methods and apparatus are provided which permit either a short or a long-spaced measurement to be made without the necessity for removing the logging instrument from the well to change measurements, and which permits both measurements to be successfully made during a single trip through a borehole traversing unconsolidated formation materials.

Accordingly, it is an object of the present invention to provide improved methods and apparatus for acoustic logging in a borehole.

It is another object of the present invention to provide improved methods and apparatus for obtaining both short and long-spaced acoustic velocity logging measurements in a borehole.

It is a specific object of the present invention to provide improved methods and apparatus for obtaining correlative short and long-spaced acoustic velocity measurements during a single trip through a borehole which traverses unconsolidated formation materials.

It is also a specific object of the present invention to provide improved methods and apparatus for selecting either a short or a long-spaced acoustic velocity measurement during a single trip through a borehole.

These and other objects and features of the present invention will be apparent from the following detailed description wherein reference is made to the figures of the accompanying drawings.

In the drawings:

FIGURE 6 is a block diagram of another embodiment of the circuitry included within the subsurface instrument depicted in FIGURE 1.

The advantages of the present invention are preferably attained by means of acoustic velocity logging apparatus employing a transmitting transducer and three receiving transducers arranged in trailing relationship, wherein the first receiver is spaced three feet from the transmitter, the second receiver is spaced one foot from the first receiver and four feet from the transmitter, and the third receiver is spaced two feet from the second receiver and six feet from the transmitter. Provision is included for switching between second and third receivers, either selectively or automatically between alternate transmitter output pulses. In the first case, means is provided whereby either the second or the third receiver may be selected from the surface of the earth. In the second case, the second and third receivers are alternately switched on and off each time the transmitter "fires," to produce both a short and a long-spaced measurement correlatively during the same trip through the borehole. In both cases, it will be noted that the third receiver is located one foot nearer to the transmitter than it is in the aforementioned Brokaw system. Accordingly, the acoustic impulse will now arrive at the third receiver with less attenuation than heretofore, and it is now clearly distinguishable over "road noise" caused by the logging tool being scraped against the wall of the borehole.

Figure 1:
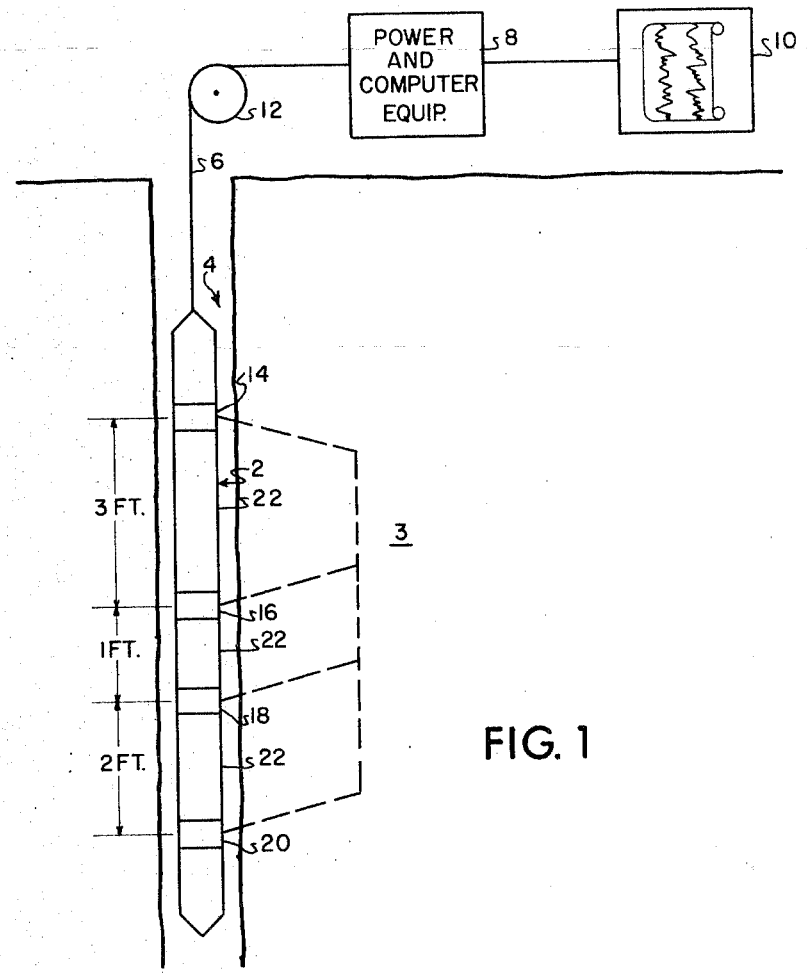
FIGURE 1 is a pictorial representation of well logging apparatus including a subsurface instrument in a typical bore hole and incorporating a preferred embodiment of the present invention.

Referring now to FIGURE 1, there may be seen an acoustic velocity logging system including a logging instrument 2 suspended in a borehole 4 by means of a logging cable 6 which is connected to surface power and computer equipment 8 and to recording equipment 10. The cable 6 passes over a measuring or sheave wheel 12, the rotation of which is co-ordinated with the operation of the recorder 10 to furnish a correlative indication of the depth at which various borehole measurments are obtained. The sheave wheel 12, which also serves to support the cable 6 and logging instrument 2 in the borehole 4, may be suspended over the mouth of the borehole 4 in any convenient manner, such as by a traveling block suspended from a derrick.

The logging instrument 2 is shown as including a transmitting transducer 14, and first, second, and third receiving transducers 16, 18, 20. As depicted, the various transducers are separated, one from another, by acoustic isolators which prevent acoustic energy from passing through the logging instrument 2, and between transducers, at a velocity greater than that with which the acoustic energy is conducted by earth materials. These isolators may be of any suitable design, such as that disclosed in Patent No. 3,102,604, which issued September 3, 1963, to A. W. Engle, but are preferably of lengths such that the first receiver 16 is spaced at least three feet from the transmitter 14, (measuring from center-to-center), and such that the second and third receivers 18 and 20 are spaced one foot and three feet, respectively, from the first receiver 16. In this arrangement, it will be noted that the third receiver 20 is spaced from the second receiver 18 only twice the distance (two feet) which the second receiver 18 is spaced from the first receiver 16, notwithstanding that long-spaced measurements preferably and commonly encompass spacings which are three times that encompassed by short-spaced measurements.

In the present invention, the transmitter 14 is preferably adapted to generate a sequence of sharp acoustic pulses which travel sequentially through the earth surrounding the borehole 4, and successively past the first, second, and third receivers 16, 18 and 20. Each of these receivers is adapted, when activated, to respond to any detected acoustic pulse by developing a functionally related electric pulse which is sent over the cable 6 to the computer section of the surface equipment. Related pulses from the first and second receivers 16 and 18 define the time interval required by the acoustic pulse to travel through the one foot thickness of earth 3 which is adjacent the first and second receivers 16 and 18, and related pulses from the first and third receivers 16 and 20 define the time interval required for the acoustic pulse to travel through the three foot thickness of earth 3 adjacent the first and third receivers 16 and 20. Accordingly, if a "short-spaced" (one-foot) measurment is sought to be made, the second receiver 18 should be rendered responsive to acoustic energy, and the third receiver 20 should be rendered unresponsive. Alternatively, if a "long-spaced" measurement is sought to be made, the second receiver 18 should be rendered unresponsive to acoustic energy, and the third receiver 20 should be rendered responsive. In a preferred form of the present invention, provision is made for selectively rendering the second and third receivers 18 and 20 responsive and unresponsive to acoustic energy, by a switching means actuated from the surface of the earth, in order that either a "short-spaced" or "long-spaced" measurement may be selected while the logging instrument 2 is disposed in the borehole 4. In another preferred form of the present invention, means synchronized with the operation of the transmitter 14 is provided to alternately render the second and third receivers 18 and 20 responsive and unresponsive with each actuation of the transmitter 14. Thus, each measurement is alternately either a short or a long-spaced measurement, and since the transmitter 14 is preferably actuated at a high frequency, both measurements may be taken simultaneously as the logging instrument is drawn through the borehole 4.

Figure 2:
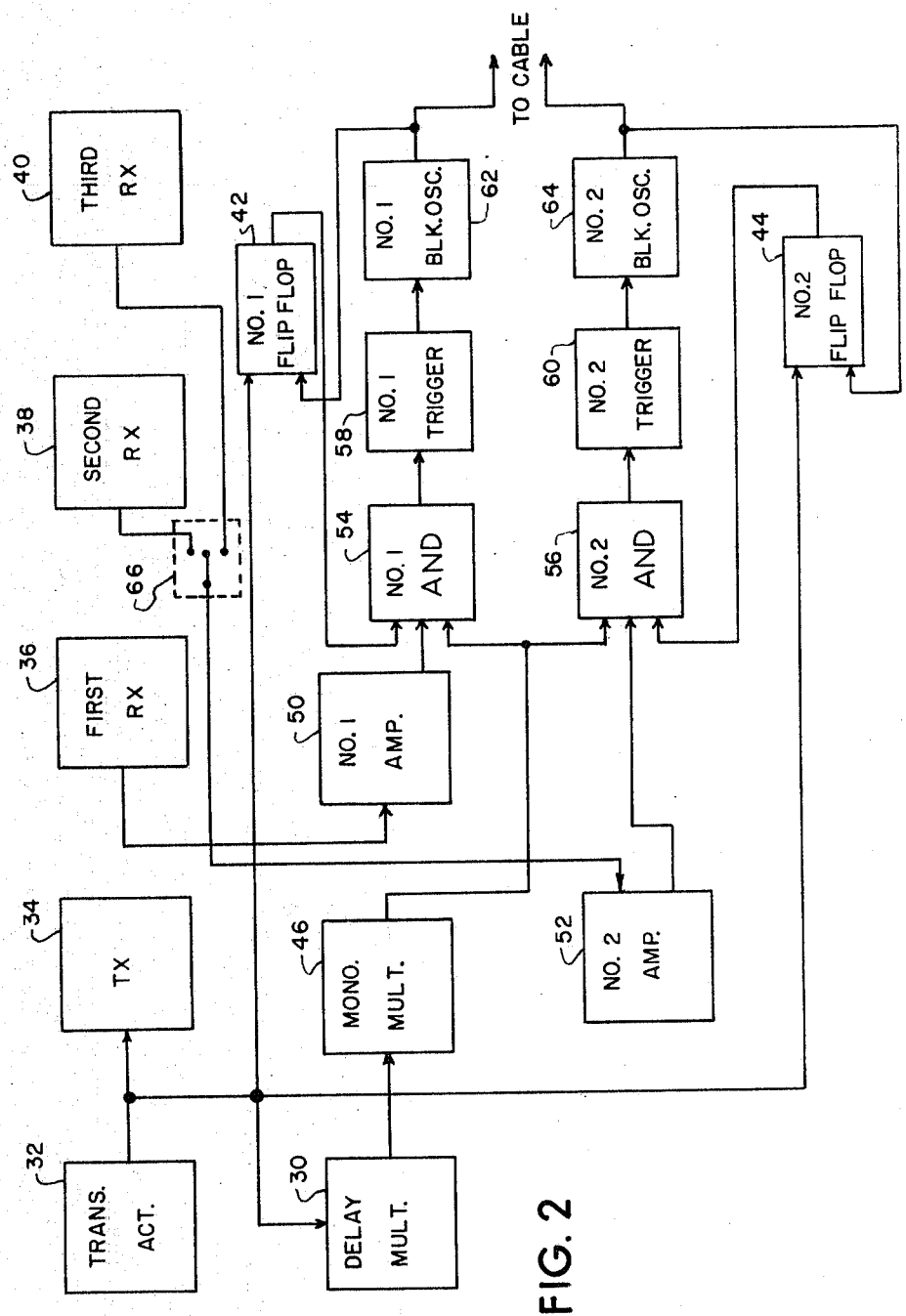
FIGURE 2 is a block diagram of one embodiment of the circuitry included within the subsurface instrument depicted in FIGURE 1.

Referring now to FIGURE 2, there may be seen a block diagram of one form of the electronics contained in the logging instrument 2, including the transmitting transducer 34 and the first, second, and third receiving transducers 36, 38 and 40. The transducers may be of any type suitable for transducing electrical energy into acoustic energy, or acoustic energy into electrical energy, but are preferably scroll-type, magnetostrictive transducers such as that depicted generally in the aforementioned Engle patent. The transmitter actuator 32, which may be of the type depicted in Patent No. 3,113,289, which issued December 3, 1963, to Adrian P. Brokaw, is adapted to deliver periodic surges of actuating current to the transmitter 34, whereby the transmitter 34 produces corresponding pulses of acoustic energy preferably at the rate of ten to twelve pulses per second.

As has hereinbefore been mentioned, passage of the logging instrument 2 through the borehole 4 gives rise to spurious acoustic energy called "road noise," and if this "road noise" is sensed by the receiving transducers it will confuse the logging measurement. Accordingly, the output pulses from the transmitter actuator 32 are also applied simultaneously to the delay multivibrator 30, as well as to the No. 1 and No. 2 flip flop circuits 42 and 44. Upon receipt of each such output pulse from the transmitter actuator 32, each flip flop is "positioned" in its receptive condition, as will hereinafter be explained. The delay multivibrator, however, reacts to each conditioning pulse to apply an actuating pulse to the monostable multivibrator 46 after a delay interval equivalent to the minimum length of time that an acoustic pulse may be expected to require to travel through the earth 3, from the transmitter 34 to the first receiver 36.

The output of the first receiver 36 is connected through the No. 1 amplifier 50 to an input of the No. 1 AND gate 54. The details of the No. 1 AND gate 54, as well as the details of the other logic circuitry hereinafter referred to, may be found on pages 397–400 and 402–404, of the publication "Pulse and Digital Circuits," by Jacob Millman and Herbert Taub. When the No. 1 flip flop 42 is in its receptive condition, it also applies an actuating signal to another input of the No. 1 AND gate 54. Accordingly, the No. 1 AND gate 54 will now pass any electrical signals generated by the first receiver 36 in response to detected acoustic energy, and will apply such signals to the No. 1 Schmitt trigger circuit 58. The output from the No. 1 Schmitt trigger 58 will then trigger the No. 1 blocking oscillator 62 to apply an information pulse to the cable 6 for transmission to the surface of the earth.

It will be noted that switch 66 is interconnected between the second and third receiving transducers 38 and 40, and the No. 2 amplifier 52. The switch 66 permits the operator to selectively detect acoustic energy with either the second or the third receivers 38 and 40. Accordingly, the output from whichever receiving transducer is selected will be applied to the No. 2 amplifier 52 in the same manner that the output of the first receiver 36 was applied to the No. 1 amplifier. The No. 2 flip flop 44 and the No. 2 AND gate 56 operate in the same manner as the No. 1 flip flop 42 and No. 1 AND gate 54 to trigger the No. 2 Schmitt trigger circuit 60 and No. 2 blocking oscillator 64.

As has hereinbefore been stated, it is essential that the acoustic pulses generated by the transmitter 34 be detected, but that the system does not respond to "road noise" to send spurious information pulses to the surface. Thus, it may be seen that the components depicted in FIGURE 2 are combined in a manner so that the system is unresponsive to acoustic energy except during time periods in which the acoustic pulses produced by the transmitter 34 may be expected to arrive at the receivers 36, 37 and 38. It has been stated that the delay multivibrator 30 does not act to energize the monostable multivibrator 46 for a preselected interval. Accordingly, the system will reject any and all "road noise" (or any other invalid signals) which may occur during this preselected interval. However, it is equally desirable that the system reject "road noise," etc. after the system has detected and responded to a valid acoustic pulse generated by the transmitter 34.

Accordingly, when either the No. 1 blocking oscillator 62, or the No. 2 blocking oscillator 64 acts to generate an information pulse, such pulses are applied to return the No. 1 and No. 2 flip flops 42 and 44, respectively, to their non-conducting condition. Thus, when the outputs from either flip flop is removed from its respective AND gate 54 or 56, the gates will no longer pass signals from their respective amplifiers 50 or 52. Consequently, the system will then reject any and all acoustic energy until the system is again rendered responsive by the next succeeding output from the transmitter actuator 32, whereupon the operation cycle is again repeated. It will be noted that the No. 1 flip flop 42 is independent of the No. 2 flip flop 44, and that the No. 1 AND gate 54 is independent of the No. 2 AND gate 56. Accordingly, actuation of the No. 1 blocking oscillator 62 will cause the system to thereupon reject further signals from the first receiver 36, during a single cycle, while the system is "waiting" for the acoustic pulse to arrive at either the second or third receiver 38 or 40.

In some cases, a valid acoustic pulse may either never arrive at the receivers 36–40, or may be so attenuated as to be undetectable. In order to prevent the system from responding to spurious signals during the period following the longest travel time which a valid pulse will require to reach the receivers, the monostable multivibrator 46 is preferably adapted to automatically "shut off" after a preselected interval. Thus, the No. 1 and No. 2 AND gates 54 and 56 will no longer pass signals from the No. 1 and No. 2 amplifiers 50 and 52, respectively, notwithstanding the fact that both the No. 1 and No. 2 flip flops 42 and 44 are still conducting and are still applying energizing signals to the No. 1 and No. 2 AND gates respectively. Accordingly, during an operating cycle beginning with the actuation of the transmitter 34, the system will not respond to acoustic energy during a first interval equal to the shortest time which the pulse may require in traveling from the transmitter 34 to the first receiver 36. Upon the expiration of this first interval, the delay multivibrator 30 will act to energize the monostable multivibrator 46, and the system will then be rendered responsive to the receipt of acoustic energy during all or part of a second interval. This second interval is equal to the longest time which an acoustic pulse may be expected to require to reach the receivers, and if no acoustic energy is received during this second interval, the system will revert to its normally-unresponsive condition. Thereafter, the system will continue in this unresponsive condition until the delay multivibrator 30 again renders the system responsive. If an acoustic pulse is received by the first receiver 36 during the second interval, the No. 1 blocking oscillator 62 will immediately terminate this second interval insofar as the first receiver 36 is concerned. Thereafter, if the second receiver 38 (or the third receiver 40) receives the acoustic pulse detected by the first receiver 36, the No. 2 blocking oscillator 64 will immediately terminate the second interval insofar as the second (or third) receiver is concerned. Accordingly, the system is rendered responsive to acoustic energy during only a short portion of the operating cycle of the system, and consequently most of the "road noise" is kept out of the logging measurement.

Another factor to be considered, insofar as the accuracy of the logging measurement is concerned, is the arrival time of the acoustic pulse at each receiving transducer. Although each acoustic pulse emanates from the transmitter 34 substantially in the form of a single, sharp "spike," the pulse is subjected to considerable reverberation and other deformity during travel through a medium. Consequently, the acoustic energy arrives at the first receiver 36 in the form of a "bunch" of pulses of various amplitudes, rather than in the form of a single pulse, and in order that the travel time of the acoustic energy be accurately measured, it is essential that the information pulses produced by the No. 1 and No. 2 blocking oscillators 62 and 64 both relate to the same portion of the acoustic energy. More particularly, the information pulses must relate to the same pulse in the "bunch" of pulses composing the acoustic energy arriving at each receiver.

Accordingly, it is necessary to "pick" the same point or pulse in the arriving acoustic energy, each time an information pulse is produced, in order that the interval defined by a pair of information pulses will accurately indicate the time required for the acoustic energy to travel through the earth 3 from one receiver to another. In the present invention, this is done by providing that the No. 1 and No. 2 Schmitt trigger circuits 58 and 60 each "fire" in response to the initial portions of the amplifier outputs reaching them from the No. 1 and No. 2 AND gates, respectively. Inasmuch as the output signals from the No. 1 and No. 2 amplifiers are functionally related in wave form to the wave form of the acoustic energy detected, respectively, by the receiving transducers connected thereto, the first portion of each amplifier output is functionally related in time and shape to the first portion of the acoustic energy to arrive at each receiving transducer. Thus, the information pulses in each case indicate the arrival of the acoustic energy at the receiving transducers, and accordingly accurately define the travel time of the acoustic pulse.

Figure 3:
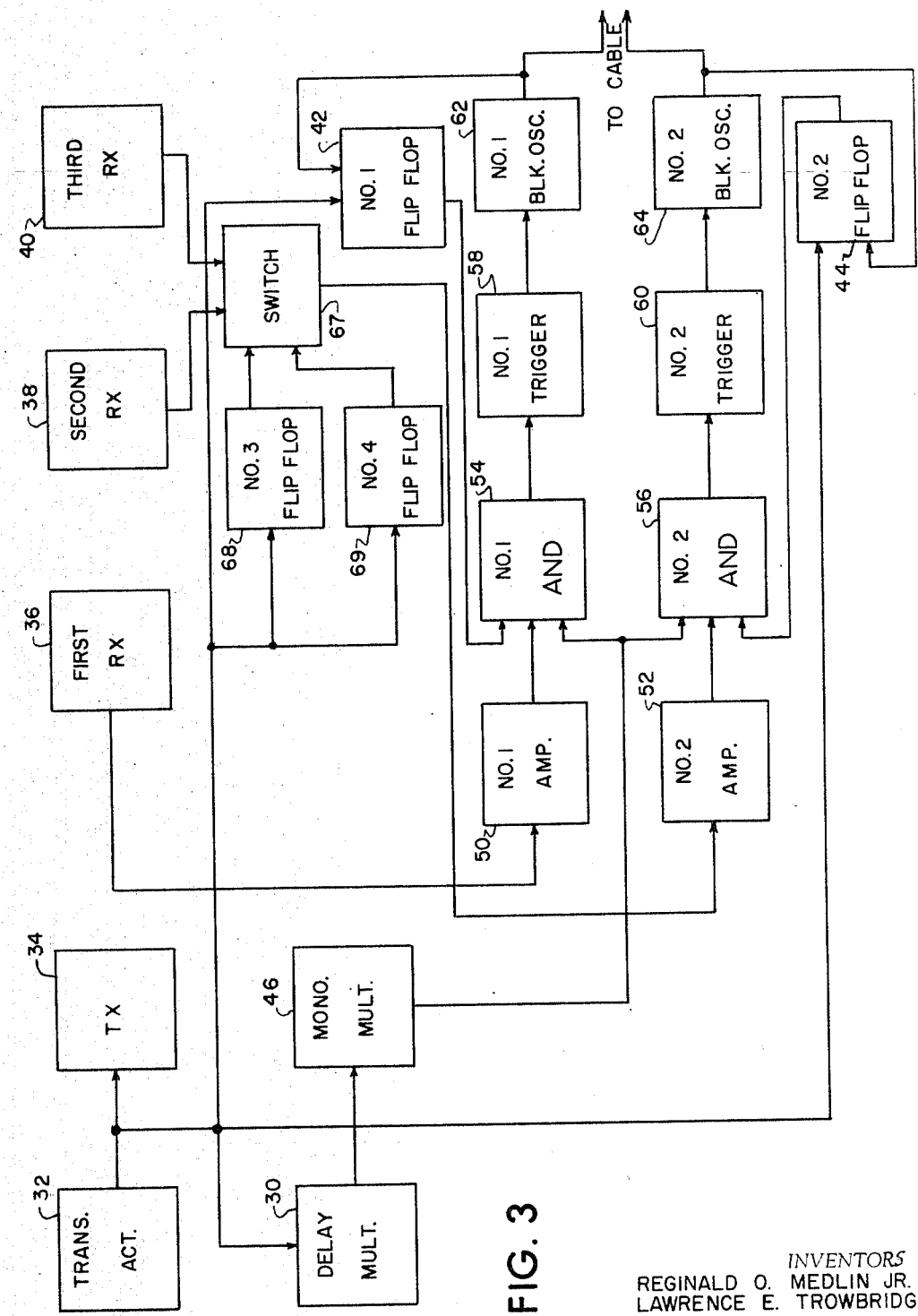
FIGURE 3 is a block diagram of a modified version of the circuitry depicted in FIGURE 1.

Referring now to FIGURE 3, there may be seen a modified version of the subsurface portion of the system depicted in FIGURE 2, wherein each actuating pulse from the transmitter actuator 32 is applied to the No. 3 and No. 4 flip flop circuits 68 and 69 which have their outputs connected to actuate the receiver switch 67. It may be seen that the No. 3 and No. 4 flip flop circuits 68 and 69 may be substantially identical in all respects, except that they are always oppositely conditioned with respect to each other. In other words, when one is conducting, the other is always non-conducting. The switch 67 may be any suitable double-throw switch, as depicted by switch 66 in FIGURE 2, except that the position of switch 67 is determined by whether the No. 3 or the No. 4 flip flop circuit 68 or 69 is in a conducting condition. For example, if the No. 3 flip flop 68 is conducting, then switch 67 may be positioned so as to connect the output of the second receiver 38 to the second amplifier 52. On the other hand, if the No. 3 flip flop 68 is inactive and the No. 4 flip flop 69 is conducting, then switch 67 may be positioned so as to disconnect the second receiver 38 and to connect the output of the third receiver 40 to the input of the second amplifier 52. Inasmuch as each actuation of the transmitter 34 changes the conditions of the No. 3 and No. 4 flip flop circuits 68 and 69, every other logging cycle will produce either a short or a long-spaced logging measurement. Inasmuch as the transmitter 34 may be cycled as often as ten to twelve times per second, or faster, the system depicted in FIGURE 3 will provide correlative short and long-spaced acoustic logging measurements during the same trip in the borehole 4.

Figure 4:
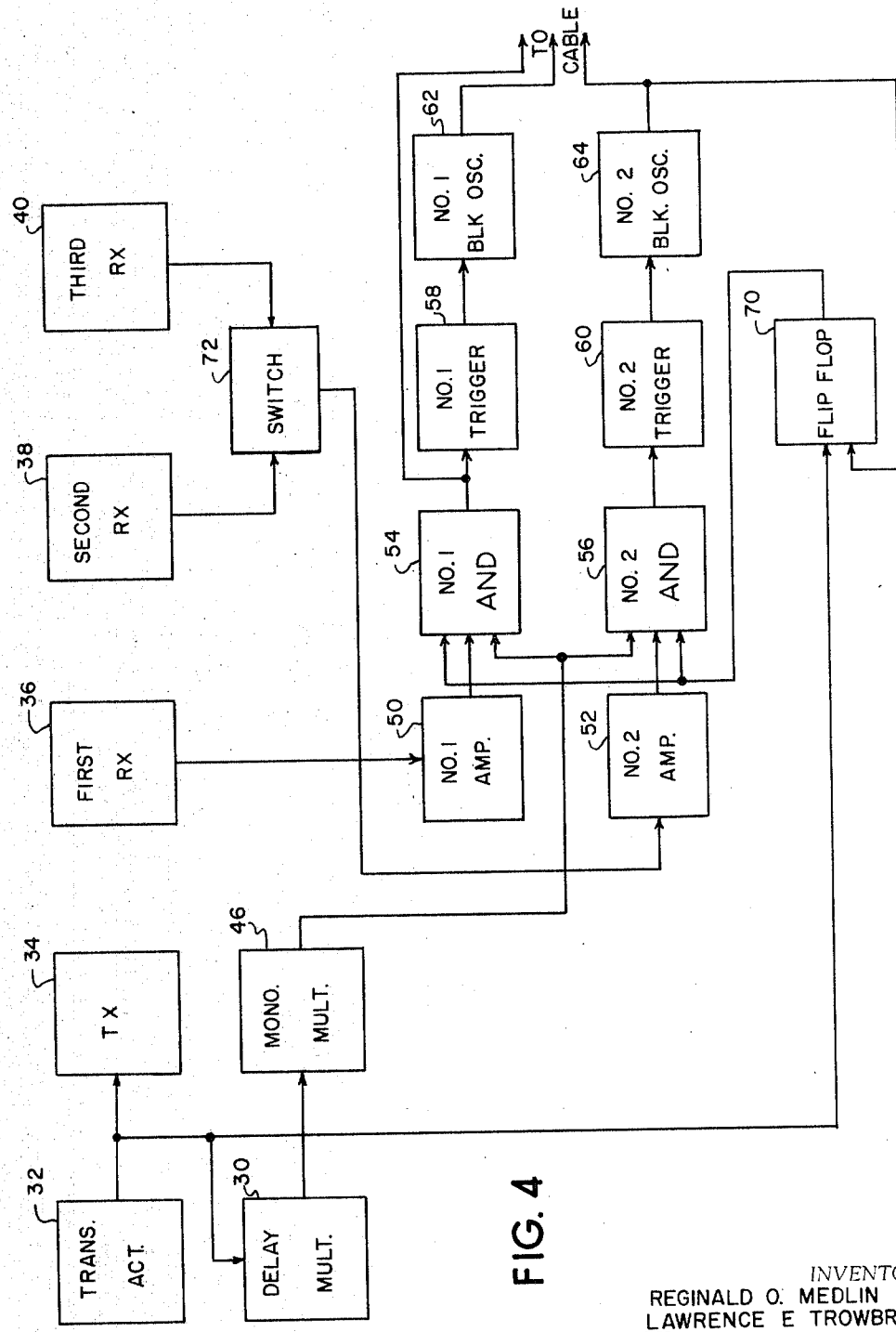
FIGURE 4 is a block diagram of another embodiment of the circuitry included within the subsurface instrument depicted in FIGURE 1.

Referring now to FIGURE 4, there may be seen another modification of the system depicted in FIGURES 2 and 3, wherein the No. 1 and No. 2 flip flop circuits 42 and 44, which appear in FIGURES 2 and 3, have been replaced by a single flip flop circuit 70. In this form of the present invention, actuation of the transmitter actuator 32 causes the flip flop circuit 70 to assume a condition such as to apply an actuating signal to both the No. 1 and No. 2 AND gates 54 and 56. On the other hand, the No. 1 AND gate 54 will remain "open" after the No. 1 blocking oscillator 62 has generated an information pulse. Accordingly, the entire electric signal representative of the total detected acoustic wave train is thus available, at the output of the No. 1 AND gate, and may therefore be conducted to the surface for detailed analysis. However, when the No. 2 blocking oscillator 64 reacts to produce an information pulse, the flip flop 70 "closes" both the No. 1 and No. 2 AND gates simultaneously to render the system unresponsive throughout the balance of each operating cycle. The switch 72 may be any suitable type of double-throw switch for switching the second and third receivers 38 and 40 in and out of the system. Furthermore, switch 72 may be selectively positionable from the surface, or it may be controlled by the actuation of the transmitter actuator 32 as depicted in FIGURE 3.

Figure 5:
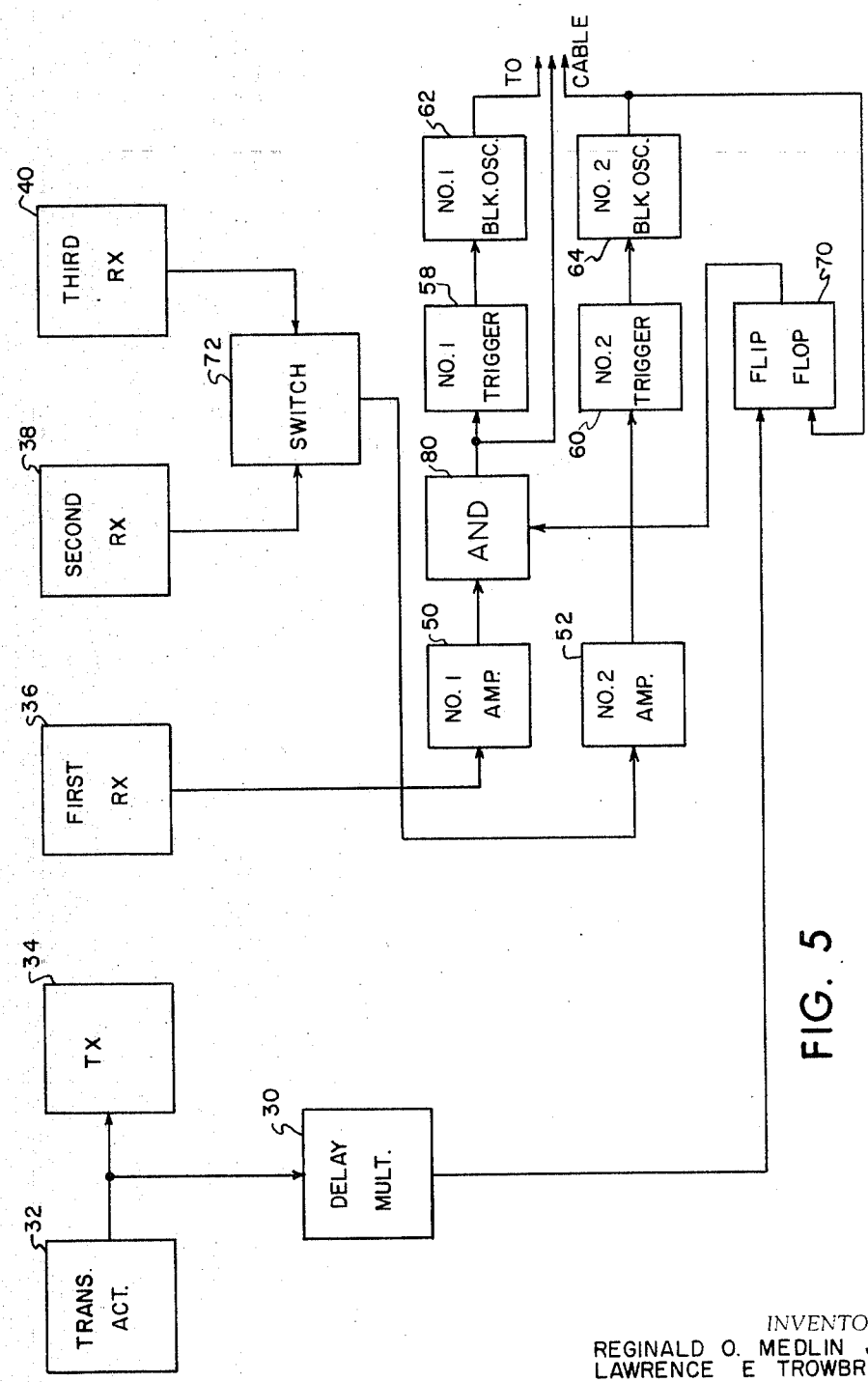
FIGURE 5 is a block diagram of an additional embodiment of the circuitry included within the subsurface instrument depicted in FIGURE 1.

Referring now to FIGURE 5, there may be seen a further modification of the system, wherein the monostable multivibrator 46 appearing in FIGURES 2–4 has been deleted, and wherein only one AND gate has been utilized. In this form of the present invention, the delay multivibrator 30 acts in response to the output of the transmitter actuator 32 to render the flip flop 70 conductive after the expiration of a time interval equal to the earliest expected arrival of the acoustic pulse at the first receiver 36. The AND gate 80 will now pass any signals arriving from the first receiver 36, and since the entire portion of the wave train will pass the AND gate 80, it may also be conducted to the surface by way of the cable 6. However, the No. 1 blocking oscillator 62 will produce an information pulse as hereinbefore described. When the No. 2 blocking oscillator 64 fires in response to an output from either the second or the third receiver 38 or 40, depending upon the position of switch 72, then the flip flop 70 is returned to its non-conductive condition and the AND gate 80 is returned to its normally-closed condition.

Referring now to FIGURE 6, there may be seen another modification of the system hereinbefore depicted which includes certain features not present in those embodiments of the present invention. In this form, the system includes a transmitter actuator 101, transmitter 102, and first, second and third receivers 103–105 operating as hereinbefore described. Similarly, the output of the transmitter actuator 101 is connected to activate the delay multivibrator 107 which, after a suitable delay interval, applies a conditioning signal to the No. 1 and No. 2 flip flop circuits 113 and 115 which are adapted to be oppositely conditioned as hereinbefore described. Accordingly, if the No. 1 flip flop 113 was in a non-conducting condition at the beginning of the operating cycle of the system, the No. 1 flip flop 113 will now change to its conducting condition, and the No. 2 flip flop 115 will revert to its non-conducting condition. Thus, a conditioning signal will be applied by the No. 1 flip flop 113 to the No. 1 AND gate 110, and the corresponding conditioning signal theretofore applied by the No. 2 flip flop 115 to the No. 2 AND gate 111 will be discontinued. The No. 1 and gate 110 will now pass any signals from the No. 1 amplifier 108 to the No. 3 flip flop 112, whereas the No. 2 AND gate 111 will now refuse any signals from the No. 2 amplifier 109.

When the first receiver 103 detects the acoustic pulse generated by the transmitter 102, it generates an electric wave train signal, which is functionally related to the occasion and shape of the acoustic wave train, and applies this signal to the No. 3 flip flop 112 by way of the No. 1 amplifier 108 and the No. 1 AND gate 110. However, the No. 3 flip flop 112, which was theretofore in a non-conducting condition, reverts to its conducting condition upon receiving the first portion of the signal from the No. 1 AND gate 110. Inasmuch as the first pulse peak in the electrical wave train signal from the No. 1 AND gate 110 represents the first portion of acoustic pulse to arrive at the first receiver 103, as hereinbefore explained, it may be seen that the commencement of the signal output from the No. 3 flip flop 112 is coincident in time with the arrival time of the acoustic pulse at the first receiver 103.

The output signal from the No. 3 flip flop 112 actuates the integrator circuit 114 which is preferably adapted to generate a linearly increasing voltage output as long as the No. 3 flip flop circuit 112 continues without interruption. Any suitable circuitry may be used for the integrator circuit 114, such as the well-known Miller integrator. The output voltage from the integrator circuit 114 is, in turn, passed to a voltage storage circuit 116, such as any suitable capacitance, which in turn accumulates a potential which is proportional in magnitude to the duration of the output from the No. 3 flip flop circuit 112. It will also be noted that the output signal from the No. 3 flip flop circuit 112 is also applied to the No. 1 and No. 2 flip flop circuits 113 and 115 to change their conditions respectively. The No. 1 flip flop 113 now becomes nonconductive, and the conditioning signal being applied to the No. 1 AND gate 110 is now discontinued to "close" the No. 1 AND gate 110. Alternatively, the No. 2 flip flop 115 reverts to its conducting condition, and now applies a conditioning signal to the No. 2 AND gate 111 which consequently "opens" to receive any output signals generated by the No. 2 amplifier 109.

As may be seen, the outputs of the second and third receivers 104 and 105 are connected to the switch 106 which functions in substantially the same manner as described with respect to switch 72 in FIGURE 5. Accordingly, two additional flip flop circuits which are responsive to the output of the transmitter actuator 101 may be included to actuate switch 106 in the manner disclosed in FIGURE 3. In either event, any signals now applied to the No. 2 amplifier 109 will now pass the No. 2 AND gate 111 to reach the No. 3 flip flop 112. The instant such a signal reaches the No. 3 flip flop 112, however, it will revert to its previous non-conducting condition and the occasion of such reversion will be coincident with the arrival time of the acoustic pulse at the second or third receiver 104 or 105.

At the instant the signal from the No. 3 flip flop 112 ceases, the interator 114 also ceases its operation, and the storage 116 will discharge its accumulated potential in the form of a voltage signal to a vacuum tube voltmeter 117. Accordingly, the magnitude of this voltage signal is a function of the travel time required by the acoustic pulse to traverse the earth 3 lying "between" the first receiver 103 and the second (or third) receiver 104 or 105. Evidence of the magnitude of this voltage signal is required to be delivered to the surface of the earth, however, and thus the vacuum tube voltmeter 117 operates to produce an indicating signal for application to the cable. If necessary, a suitable cable driving circuit 118 may be included to process the signal before it is sent to the surface for recording.

In this form of the present invention depicted in FIGURE 6, only one cable conductor is required for transmitting acoustic velocity measurement data to the surface, and the signals which represent this data are not particularly affected by cross talk and other adverse effects which are often present in multi-conductor cables. In those forms of the present invention depicted in FIGURES 2–5, however, wherein information pulses are sent to the surface to delineate the acoustic velocity measurement, such pulses are preferably (though not necessarily) sent to the surface over separate conductors. Although pulses from the first and third receivers will usually be spaced sufficiently in time so that they will be readily distinguishable at the surface, pulses successively received from the first and second receivers may arrive so close together that one pulse may be "overlooked" if they arrive by way of the same conductor. Since pulses sent over long multi-conductor cables tend to be "smeared" or otherwise distorted during transmission, and since this distortion affects the accuracy of the measurements sought to be obtained, it may be desirable to transmit "long-spaced" pulses over the same conductor. In any event, it will be noted that in those embodiments of the present invention wherein information pulses are sent to the surface, and wherein the switch between the second and third receivers is operated in synchronism with the actuation of the transmitter, both a long and a short-spaced measurement is obtained with only two cable conductors.

Numerous other variations and modifications may obviously be made without departing from the essence of the present invention. Accordingly, it should be clearly understood that those forms of the invention which are described herein and depicted in the accompanying drawings are illustrative only and are not intended to be the limits of the scope of the invention.

What is claimed is:

1. An acoustic well logging system comprising surface recording means, a subsurface instrument, and a logging cable interconnecting said instrument and said recording means, said instrument further including a transmitter arranged and adapted to generate acoustic pulses, a transmitter actuator arranged and adapted to periodically actuate said transmitter at a preselected frequency, a first receiver means spaced a first distance from said transmitter, a second receiver means trailingly spaced from said transmitter and said first receiver means a predetermined second distance from said first receiver means, a third receiver means trailingly spaced from said transmitter and said first and second receiver means a third predetermined distance from said second receiver means which is twice said second predetermined distance, signal generating means having two inputs and having an output connected to said logging cable, means connecting said first receiver means to one of said two inputs of said signal generating means, switch means responsive to actuation of said transmitter actuator for alternately connecting and disconnecting said second and third receiver means to and from the other of said two inputs of said signal generating means upon respective alternate actuations of said transmitter, and gating means responsive to actuation of said transmitter to render said signal generating means responsive to said first receiver means and said one of said second and third receiver means.

2. The apparatus described in claim 1, wherein said switch means is arranged and adapted to be remotely actuated in a manner to selectively connect one of said second and third receiver means to said other of said two inputs of said signal generating means.

3. The apparatus described in claim 1, including means responsive to actuation of said transmitter means for causing said swiitch means to alternately connect and disconnect said second and third receiver means to said other of said two inputs of said signal generating means.

4. The apparatus described in claim 1, wherein said signal generating means is further adapted to accept only the first portion of any signal generated by said first receiver means and to accept only the first portion of any signal generated to said one of said second and third receiver means.

5. The apparatus described in claim 4, wherein said signal generating means is further adapted to generate an electrical signal which is functionally related to the travel time of one of said acoustic pulses between said first and said one of said second and third receiver means.

6. The apparatus described in claim 4, wherein signal generating means is further adapted to generate information pulses coincident with the arrival of said acoustic pulses at said first and said one of said second and third receiver means.

References Cited by the Examiner

UNITED STATES PATENTS

| 2,931,455 | 4/1960 | Loofbourrow | 340—18 X |
| 3,062,314 | 11/1962 | Vogel et al. | 181—.5 |
| 3,082,837 | 3/1963 | Summers | 181—.5 |
| 3,102,992 | 9/1963 | Savage et al. | 340—18 |
| 3,148,352 | 9/1964 | Summers | 340—18 |
| 3,149,304 | 9/1964 | Summers | 340—18 |
| 3,191,145 | 6/1965 | Summers | 181—.5 X |
| 3,212,598 | 10/1965 | Anderson | 340—18 X |

BENJAMIN A. BORCHELT, *Primary Examiner.*

R. M. SKOLNIK, *Assistant Examiner.*